United States Patent [19]

Wolfe et al.

[11] Patent Number: 5,685,576
[45] Date of Patent: Nov. 11, 1997

[54] PIPE COUPLING

[76] Inventors: Donald H. Wolfe, #301, 10305-120 Street, Edmonton, Alberta, Canada, T5K 2A5; David R. Budney, 6420-187 Street, Edmonton, Alberta, Canada, T5T 2N3

[21] Appl. No.: 471,480

[22] Filed: Jun. 6, 1995

[51] Int. Cl.$^6$ .............................. F16L 55/00; F16L 33/01
[52] U.S. Cl. .................... 285/149; 285/249; 285/255; 285/322; 285/412; 285/915
[58] Field of Search ......................... 285/149, 332, 285/412, 414, 368, 249, 255, 915

[56] References Cited

U.S. PATENT DOCUMENTS

| | | |
|---|---|---|
| 732,415 | 6/1903 | Janet . |
| 2,200,082 | 5/1940 | Guarnaschelli ................ 285/255 X |
| 2,393,058 | 1/1946 | Pierce et al. . |
| 2,405,909 | 8/1946 | Smith et al. . |
| 2,809,056 | 10/1957 | Kaiser .............................. 285/149 |
| 2,825,364 | 3/1958 | Cullen et al. . |
| 2,940,778 | 6/1960 | Kaiser ........................... 285/149 X |
| 2,973,975 | 3/1961 | Ramberg et al. .............. 285/249 X |
| 3,306,637 | 2/1967 | Press et al. ................... 285/249 X |
| 3,378,426 | 4/1968 | Medney . |
| 3,858,616 | 1/1975 | Thiery et al. . |
| 3,936,118 | 2/1976 | Thiery et al. ................. 285/149 X |
| 4,013,100 | 3/1977 | Thiery et al. . |
| 4,019,539 | 4/1977 | Hoffmann et al. . |
| 4,143,892 | 3/1979 | Murphy et al. ................... 285/149 |
| 4,213,485 | 7/1980 | Ottewell et al. . |
| 4,256,146 | 3/1981 | Genini et al. . |
| 4,332,509 | 6/1982 | Reynard et al. . |
| 4,364,418 | 12/1982 | Genini et al. . |
| 4,377,186 | 3/1983 | Genini et al. . |
| 4,403,631 | 9/1983 | Abdullaev et al. . |
| 4,549,581 | 10/1985 | Unno et al. . |
| 4,588,461 | 5/1986 | Braun . |
| 4,605,466 | 8/1986 | Eisenzimmer ................ 285/915 X |
| 4,850,619 | 7/1989 | Lantos et al. ................. 285/915 X |
| 4,903,735 | 2/1990 | Delacour et al. . |
| 4,950,001 | 8/1990 | Briggs ........................... 285/255 X |
| 5,024,252 | 6/1991 | Ochsner . |
| 5,061,338 | 10/1991 | Huvey . |
| 5,064,491 | 11/1991 | Huvey . |
| 5,129,429 | 7/1992 | Winter et al. . |
| 5,261,462 | 11/1993 | Wolfe et al. . |
| 5,435,867 | 7/1995 | Wolfe et al. . |

FOREIGN PATENT DOCUMENTS

| | | |
|---|---|---|
| 1164367 | 5/1984 | Canada . |
| 1269282 | 5/1990 | Canada . |
| 2027568 | 12/1990 | Canada . |
| 2030482 | 5/1991 | Canada . |
| WO8706184 | 10/1987 | European Pat. Off. . |
| 1902453 | 7/1970 | Germany . |
| 2361162 | 6/1974 | Germany . |
| 8823 | 1/1906 | United Kingdom ............ 285/149 |
| 1316012 | 5/1973 | United Kingdom . |
| 2148447 | 5/1985 | United Kingdom . |

*Primary Examiner*—Terry Lee Melius
*Assistant Examiner*—Heather Shackelford
*Attorney, Agent, or Firm*—Weiser & Associates P.C.

[57] ABSTRACT

A connector for a composite pipe includes a male conical member to be inserted between inner and outer layers of the pipe. The outer layers have oppositely wound composite strips which are overlapped along the conical surface. The ends of the strips are braided and a cup located over the conical surface. A filler is injected between the cup and conical member to fill the voids formed between the overlapping strips.

20 Claims, 7 Drawing Sheets

PIPE COUPLING

The present invention relates to a connection for a tubular composite structure.

In U.S. Pat. No. 5,261,462, there is described a tubular composite structure which may be used as a flexible pipe. The structure shown in U.S. Pat. No. 5,261,462 is made up of a number of layers of helically wound composite with elastomeric strip interposed between the successive passes of the composites. A pair of layers are provided with radical projections that are located between a pair of elastomeric strips of an adjacent layer so that relative movement between the adjacent layers is controlled during bending.

The tubular structure shown in the above-noted U.S. patent has met with acceptance in the field and provides an effective alternative to conventional steel welded pipe. It is, however necessary to connect the composite structure to conventional fittings to facilitate its installation in a practical environment.

In the above-noted U.S. patent, there is shown a method of connecting a pair of tubular structures in end-to-end relationship by utilizing the helically wound nature of the composite layers. The elastomeric strips between the composite layers are removed and replaced with further composite layers so that a strong connection could be obtained. It was also proposed in the prior patent that a similar process might be utilized with a coupling by providing helical recesses in the flange of the coupling and laminating the tubular structure to the coupling.

Such an arrangement has not been found satisfactory due to the high end loads that are imposed upon the flexible couplings and the tendency of the composite structure to unwind from the coupling when subjected to pressure fluctuations. In general, it is found that the interface between the flexible tubular structure and the end fitting should have at least the same structural integrity as the flexible pipe itself and that such a connection should be designed and tested to ensure that it equals or exceeds the maximum axial load in the pipe due to transportation and service loading. This axial load can result from external axial tension or can be generated by internal pressure.

A common technique to connect an end fitting to a flexible pipe involves swaging an outer wall of the fitting to trap the pipe wall between concentric walls of the fitting. The mechanical interference provided resists axial loads and radial projections on the walls of fitting increase the grip on the pipe wall. This technique relies upon the resilience of the pipe wall and so is not practical where relatively rigid elements are use to fabricate the pipe wall.

An alternative technique is used with flexible pipe distributed by Wellstream Corporation. Such pipe utilizes an interlocked steel carcass that has limited axial movement between adjacent passes to allow limited bending. Helically wound wire layers support the carcass. The wire layers are wound in opposite hand and are laid over a reverse taper on the fitting to secure the fitting. A cavity within the fitting is filled with epoxy to hold the layers in situ and resist axial loads.

The use of the reverse taper introduces a spreading force on the overlapping wires as an axial load is applied which tends to allow the wires to extrude from the fitting. Moreover, the initial increase in diameter necessary to provide the reverse taper introduces potential slackness in the fitting that may permit an initial axial movement of the pipe relative to the fitting.

It is an object of the present invention to provide a connector that obviates or mitigates the above disadvantages.

According to the present invention, there is provided in general terms a connector for a multi-layered composite tubular structure in which a cone member is inserted between adjacent layers of the tubular structure. The radially outer layers of the structure are helically wound in opposite directions over the conical outer surface of the cone. A female cone member is positioned over the radially outer surface of the outer layers and an axial force applied between the two cone members to clamp the composite layers between their conical surfaces.

Preferably the layers are braided to one another at their distal end to maintain structural integrity and as a further preference a wire is braided into the strips to provide a circumferential band. A filler is applied to the voids between the strips and conical surfaces. The surfaces are arranged so that axial forces applied to the pipe tend to reduce the volume of the voids and the filler thereby opposes such reduction.

An embodiment of the invention will now be described by way of example only with reference to the accompanying drawings, in which FIG. 1 is a general side view of a tubular structure with the layers thereof progressively removed;

Figure 1:
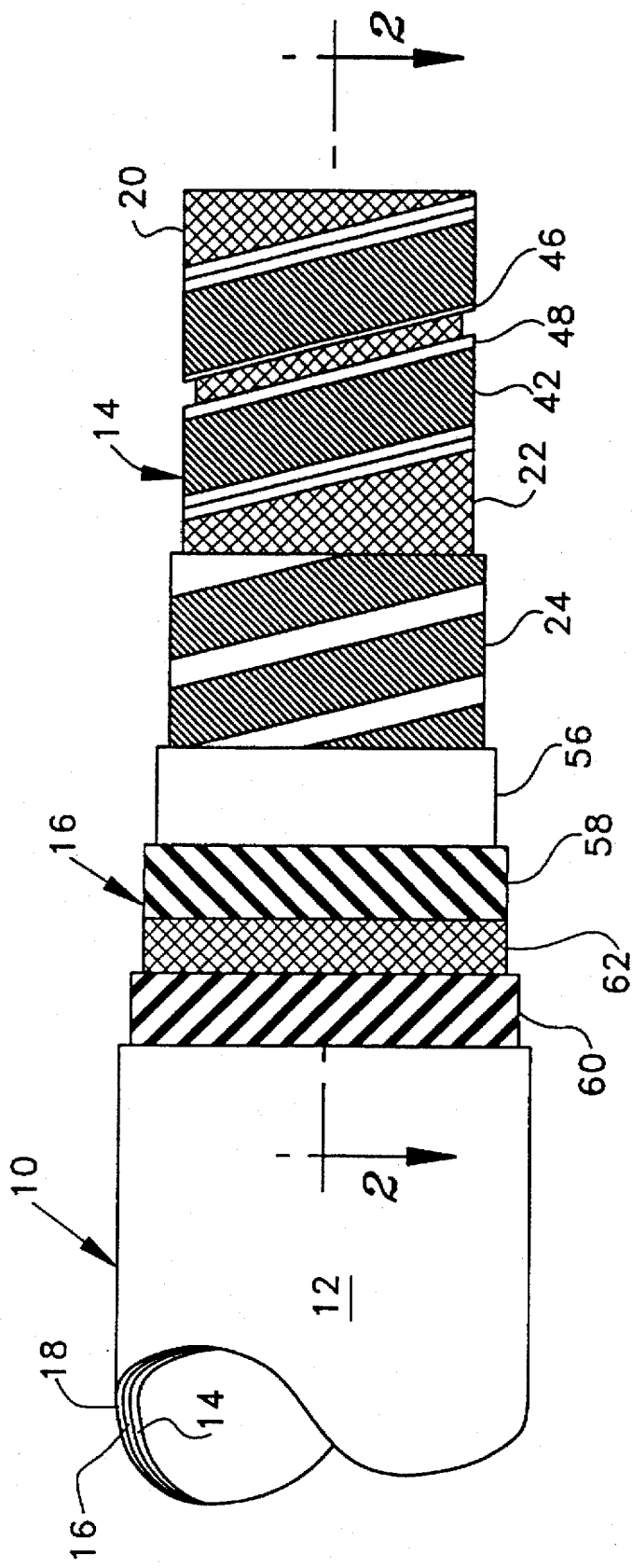
Figure 2:
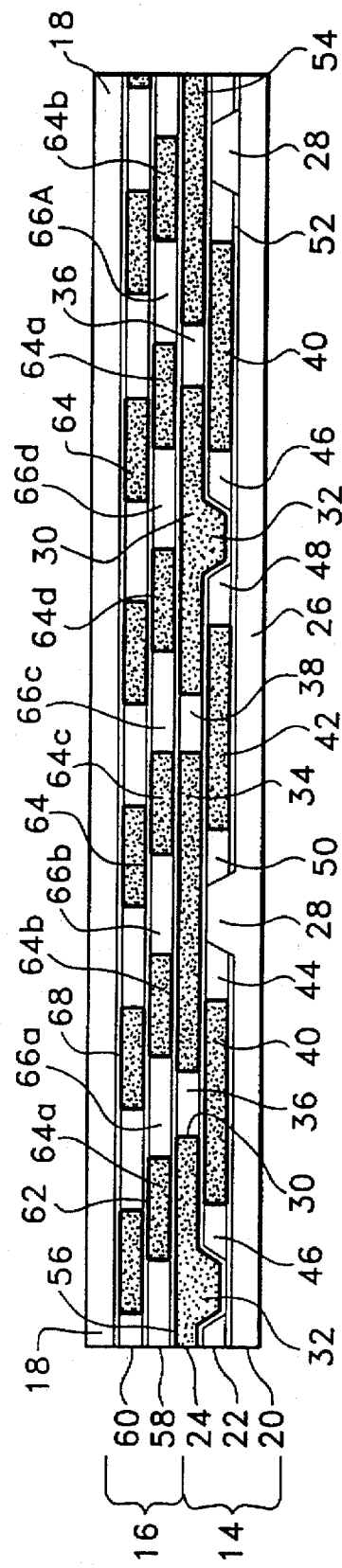
FIG. 2 is a section on the line 2—2 of the structure shown in FIG. 1.

FIGS. 1—2 show a tubular structure as exemplified in the above-noted U.S. patent and which will be described briefly to assist in the understanding of the present invention.

Referring therefore to FIG. 1, a tubular structure 10 has a circumferential wall 12 that is formed from a pair of juxtaposed wall elements 14,16. An outer sheath 18 completes the wall 12 and provides protection from the environment for the elements 14,16.

As can best be seen in FIG. 2, the radially inner wall element 14 comprises three separate layers, namely 20, 22 and 24. The inner layer 20 consists of a continuous flexible plastic cylinder 26 having a spirally wound protrusion 28 projecting radially outwardly therefrom. The layer 20 can typically be formed from a thermoplastic polymer or elastomeric material and is preferably impermeable to the fluids to which it may be exposed. Layer 20 may also act as an inner liner although a separate liner of impermeable material may be provided so that the cylinder 26 may be formed from a material having different properties.

The outer layer 24 of the inner wall element consists of a spirally wound composite strip 30 having a radially inward projection 32 directed towards the inner layer 20. The composite strip 30 has the same pitch and hand as the spiral projections 28. However, the projections 32 and 28 are staggered axially and overlap in the radial direction.

A second spirally wound composite strip 34 is located between the successive passes of the strip 30 and located axially so as to be aligned with the projection 28. Composite strips 30,34 each consist of a bundle of fibres or roving, for example E-glass, generally orientated in the direction of the winding with a matrix disbursed between the fibres. The strips may contain transverse fibres to resist secondary stresses such as transverse shear, interlaminar shear, longitudinal shear, and cross fibre shear in the strip that are induced by internal pressure and in bending of the structure. The matrix may, for example, be polyester. Typically, the composite strips will have 75% by weight of fibre and 25% by weight of matrix although, as will be discussed more fully below, alternative materials and ratios may be used.

Located between the composite strips 30,34 are a pair of spirally wound elastomeric strips 36,38. These strips may be any suitable elastomer such as neoprene. Strips 36 and 38 are located on opposite flanks of the composite strip 30 and act to maintain the composite strips 30 and 34 in spaced relationship.

An intermediate layer 22 is located between the layers 20,24 and consists of a pair of composite spirally wound strips 40,42. Each of these strips 40,42 is of the same hand and same pitch as the strips 30 and 34 and is axially located so as to overlap in the axial direction each of the adjacent strips 30,34 in the outer layer 24. Each of the strips 40 and 42 is located between adjacent ones of the projections 32,28. A pair of elastomeric strips 44,46 and 48,50 is associated with the composite strips 40 and 42 respectively and located on opposite sides thereof. Strip 44 is thus interposed between the composite strip 40 and the projection 28 and elastomeric strip 46 is interposed between the strip 40 and projection 32. Similarly, the elastomeric strips 48 and 50 are interposed between the composite strip 42 and the projections 32 and 28 respectively.

A layer of friction-reducing material such as polyethylene film 52 is located between the inner layer 20 and intermediate layer 22. Similarly, a layer of friction-reducing material 54 is applied between the outer layer 24 and intermediate layer 22 so as to minimize the resistance to relative movement between the layers 22 and 24.

Outer wall element 16 is separated from the inner wall element 14 by a friction-reducing film 56. The outer wall element 16 consists of inner and outer layers 58,60 which in turn are separated by a friction-reducing film 62. Each of the layers 58 and 60 consists of alternating composite strips 64 and elastomeric strips 66 that are spirally wound. The pitch between successive passes of each strip 64 is greater than that of the composite strips of the inner wall element 14 so that in general there will be a greater number of individual strips 64 than there are strips 30,34. For added clarity, each separate strip 64 has been denoted with a suffix a,b in FIG. 3 with the corresponding elastomeric strip 66 also denoted with suffixes a, b and c. The pitch of the strips 64,66 in outer layer 60 of the outer wall element 16 is the same as that of the inner layers 58. However the strips 64,66 in the layer 60 are wound in an opposite hand to those in the layer 58 as can be seen in FIG. 1.

A friction-reducing film 68 is located between the outer sheath 18 and the layer 60 to minimize resistance to relative movement between the sheath and outer layer 60.

In operation, the principal bending stiffness of the structure 10 is determined by the flexible layer 20. The composite strips of the outer layer 24 and intermediate layer 22 of wall element 14 essentially constitute helical springs formed from composite material and do not contribute significantly to the bending stiffness of the overall structure. The overlapping of the composite strips of the intermediate layer 22 and outer layer 24 provides a continuous barrier of composite mateial in a radial direction in the wall element 14 and thereby supports the layer 20 against internal pressure to inhibit extrusion of the layer 20 through the wall element 14. The elastomeric strips act to maintain the composite strips uniformly distributed along the axial length of the tubular structure and interact with the projections 28 and 32 to maintain the composite strips 40,42 of the intermediate layer centred between the composite strips 30,34 of the outer layer 24.

As the tubular structure is flexed transverse to its longitudinal axis, the composite strips on one side of the natural axis move apart and the composite strips on the other side of the neutral axis move together. This is accommodated by a bodily displacement of the elastomeric strips which, however, maintain a uniform loading across the composite strip to maintain them uniformly distributed and maintain the continuous composite barrier in the radial direction.

Further detail of the manufacture and performance of the tubular structure may be found from prior U.S. patent and need not be described further at this time.

In order to connect the pipe 10 to a conventional fitting it is necessary to provide a connector that terminates the pipe and permits a fitting to be attached to the pipe.

Figure 3:
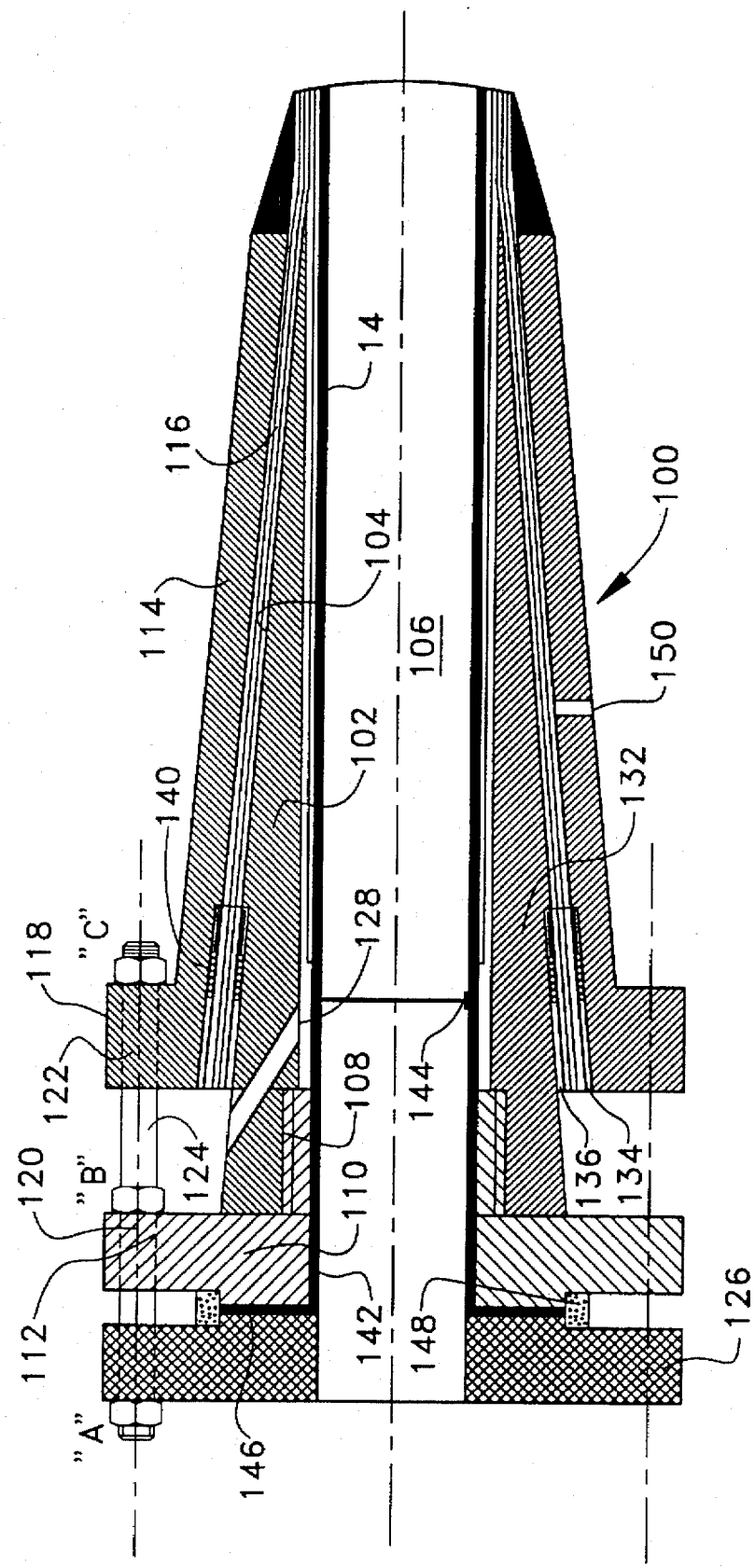
FIG. 3 is a sectional view of the tubular structure of FIGS. 1–3 incorporating a connector.

Referring therefore to FIG. 3, a connector generally indicated 100 includes a male conical member 102 that has a radially outer conical surface 104 and an internal bore 106. The bore 106 has a thread 108 that receives a boss 110 of a flange 112. The conical member 102 is secured to the flange 112 by the thread 108 and boss 110. It may be welded if preferred.

Connector 100 also includes a cup 114 having a conical inner surface 116 of similar included angle to the surface 104. The cup 114 terminates one end in a flange 118 of similar diameter to the flange 112.

Each of the flanges 112,118 include holes 120,122 respectively to receive studs 124. The holes 120 in flange 112 are threaded to engage the studs 124 whereas the holes 122 in flange 118 provide a clearance for the studs 124. Studs 124 project to the opposite side of flange 112 to the cup 114 and so provide suitable attachment to a conventional fitting 126 shown in ghosted outline.

An injection port 128 is provided in the male member 102 to allow a filler to be injected into the bore 106. Similarly, a port 130 is provided in the cup 114 to allow a filler to be injected between the conical surfaces 104,116 of the male member and cupn respectively.

A shoulder 132 is formed on the surface 104 to provide a circumferentially extending recess and a similar undercut 134 is formed on the inner surface 116. The shoulders 132,134 define an annular recess indicated at 136 extending about the connector 100.

As shown in FIG. 3, the male member 102 is dimensioned to be inserted between two of the layers that collectively make up the wall elements 14,16.

The bore 106 is dimensioned to receive the layers that make up the inner wall element 14. The inner layer 20 is welded to a stub end 142 at the seam 144. A radial web 146 on the stub end 142 extends across the face of the flange 112 to provide a sealing face with the fitting 126. A compression ring 148 inhibits extrusion of the web 146 as the fitting 126 is tightened against flange 112.

The assembly of the connector 100 to the pipe 10 proceeds as follows with the dimensions recited being typical for a 2 inch internal diameter pipe:

1. The cup 114 is placed over the pipe (pipe end of the cup first) at a distance from the pipe end so that there is enough space for the subsequent steps.
2. A hose clamp is tightened onto the pipe approximately 20 inches from the end for a pipe of 2 inch diameter.
3. The outer cover 18 is removed from the pipe end to the hose clamp.
4. The elastomer strips 66 of layer 60 are removed from the pipe end to the hose clamp.
5. The composite strips 64 of layer 60 are peeled back from the pipe end to the hose clamp.

Figure 4:
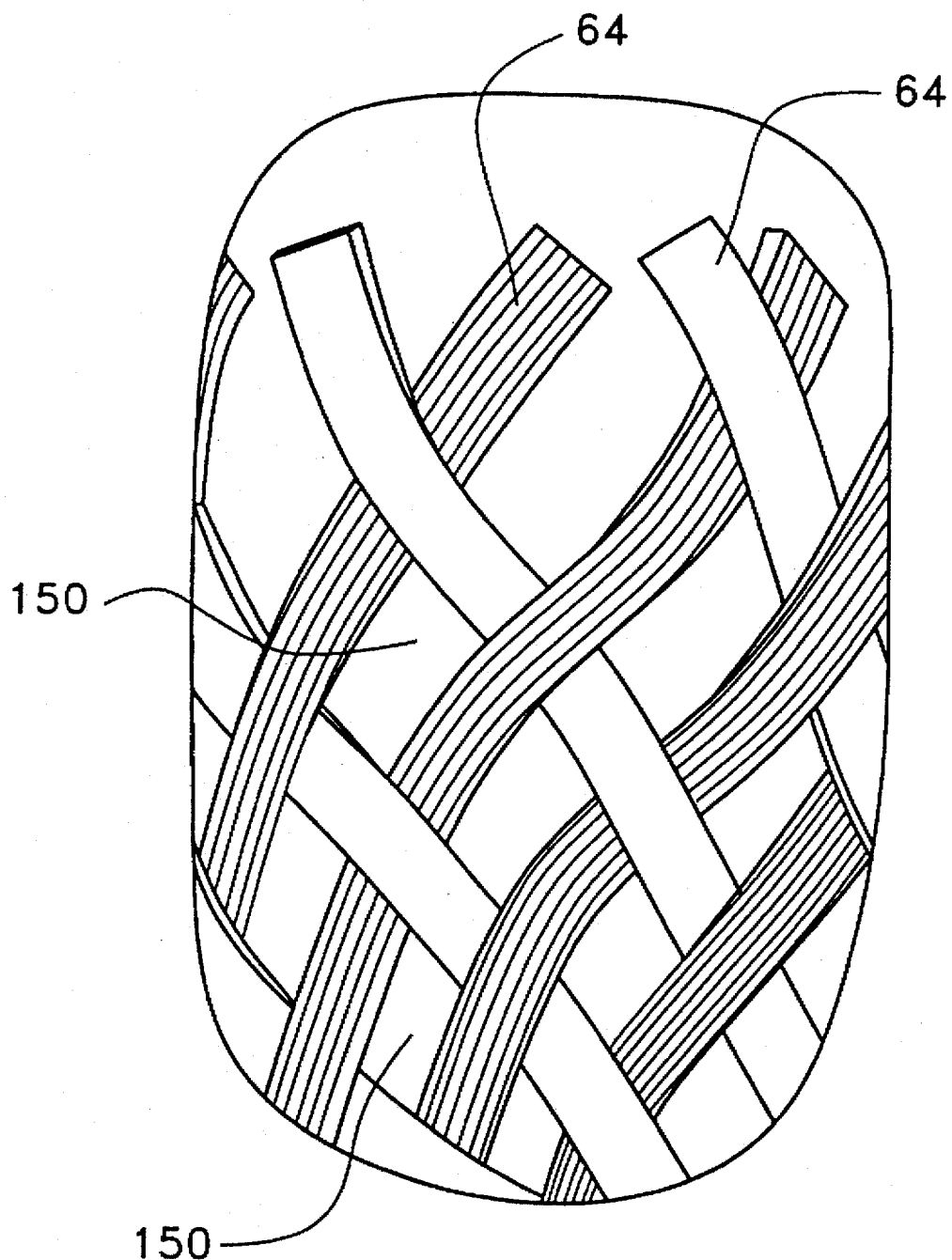
FIG. 4 is a side view showing a portion of the connector.
Figure 5:
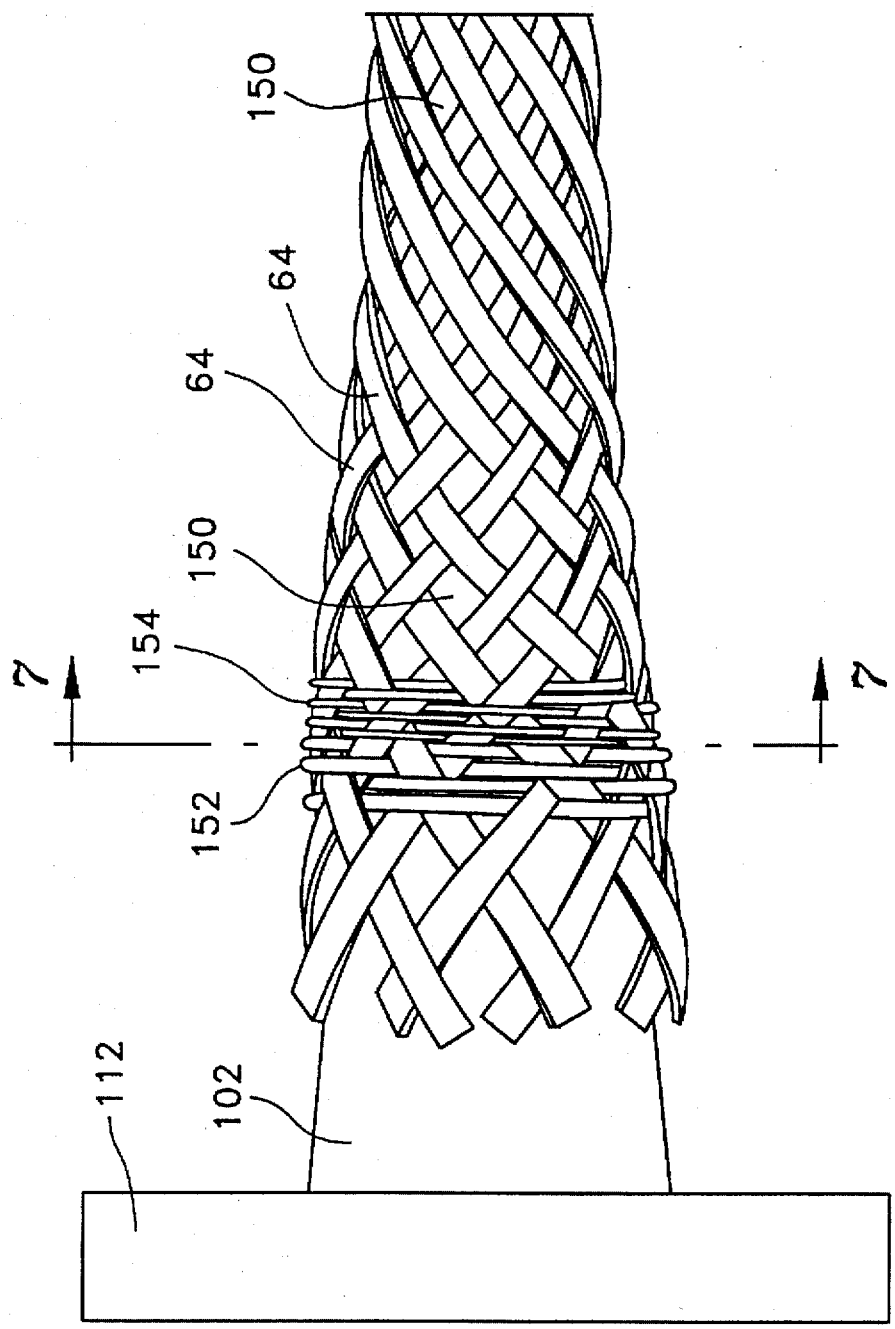
FIG. 5 is a view similar to FIG. 4 showing a subsequent stage in the formation of a connector.
Figure 6:
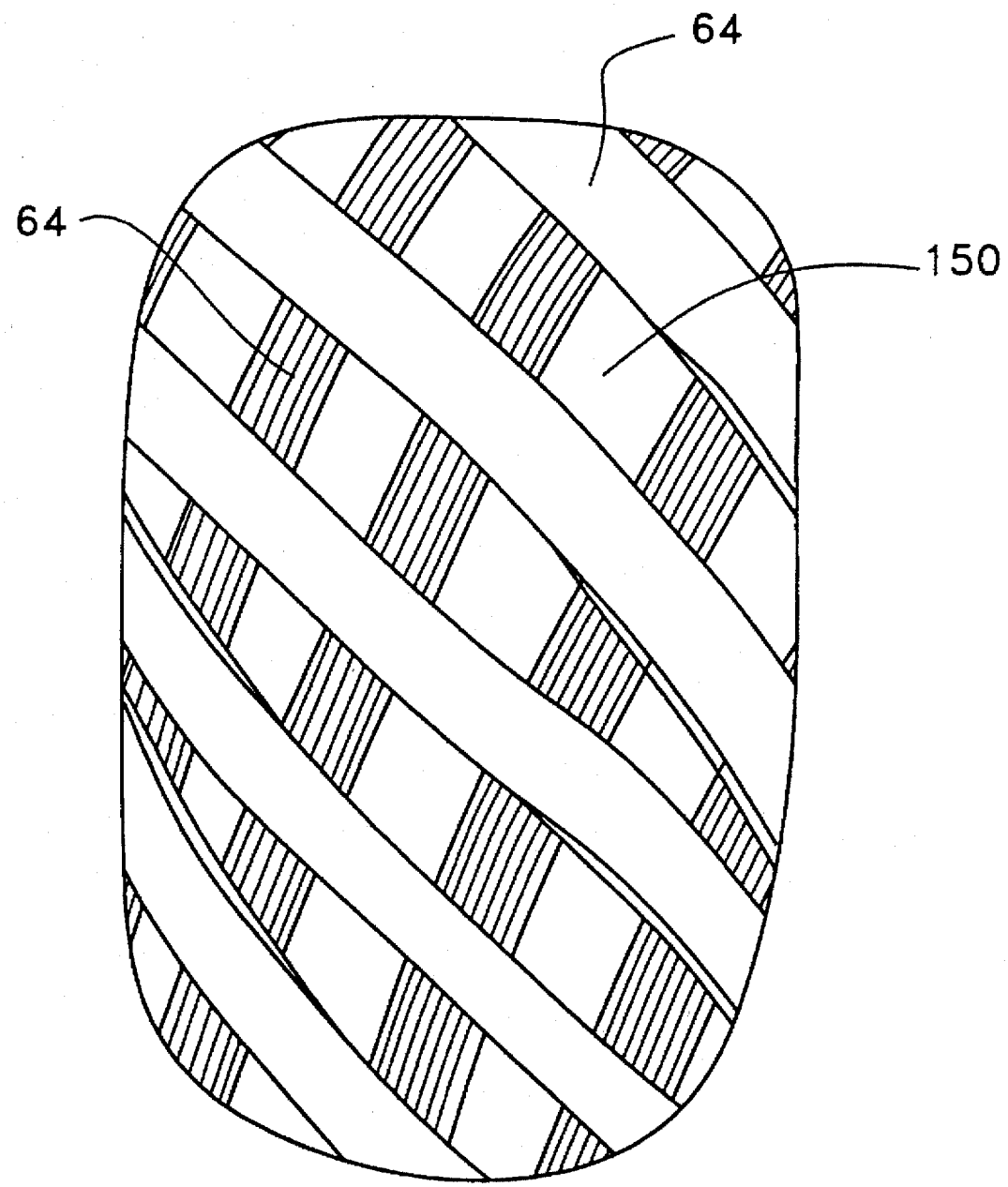
FIG. 6 is a view portion of FIG. 4 on an enlarged scale.

6. The exposed layer of polyethylene film 62 is removed from the pipe end to the hose clamp.
7. The elastomer strips 66 of layer 58 are removed from the pipe end to the hose clamp.
8. The composite strips 64 of layer 58 are peeled back from the pipe end to the hose clamp.
9. The exposed layer of polyethylene film 56 is removed from the pipe end to the hose clamp.
10. Two inches is removed from the end of the inner wall element 14.
11. A half inch of layers 24 and 22 are removed to expose the inner liner 20.
12. The elastomer strips 36,38 of layer 24 are removed back to 15 inches from the end of the pipe.
13. A minimum of 3 inches, and preferably up to 15 inches, of polyethylene film 54 is removed from the end of the pipe between layers 24 and 22.
14. A minimum of 3 inches, and preferably up to 15 inches, of elastomer strips 44,46,48,50 are removed from the end of the pipe in layer 22.
15. The cone 102 is slid over the inner wall element 14 as close as possible to the hose clamp so that at least 2½ inches of the inner wall element 14 is exposed behind the cone 102.
16. The stub end 142 is inserted through the threaded flange 112 and trimmed so that it extends 3 inches beyond the threaded flange 112 which is then positioned at the end of the pipe 10.
17. Both the stub end 142 and the pipe 10 are supported (at the exposed inner wall element 14 and the stub end 142 is fused to the exposed inner liner 20.
18. The flashing is removed from the seam 144.
19. The cone 102 is moved to the threaded flange 112 and screwed onto the boss 110.
20. The hose clamp is removed and the composite strips 64 of layers 58 and 60 of the outer wall element 16 are then wrapped onto the cone. The strips overlap to provide a diamond pattern, as shown in FIGS. 4,5, and 6, and define voids between the adjacent layers.
21. The last 6 inches of the composite strips 64 at the flange end of the cone 102 are braided with one another such that each of the composite strips 64 of layer 58 passes repeatedly over, and then under, the composite strips 64 of layer 60.
22. A one sixteenth inch diameter steel wire 154 is braided together with the composite strips 64 of layers 58 and 60 for a length of ½ inch immediately behind the cone shoulder 132.
23. A one eighth inch diameter steel wire 152 is braided together with the composite strips 64 for a length of ½ inch immediately behind the previous braided steel wire.
24. The cup 114 is moved over onto the braided cone 102, and rotated so that the cup vent hole 130 is 180° from the cone injection hole 128.
25. The cup 114 is tightened to the threaded flange 112 by studs 124.
26. The pipe is pretensioned to 1,000 pounds axial load.
27. A liquid thermosetting polymer resin such as epoxy or vinyl ester is injected through the cone injection hole 128 into the void between the cup and the cone and the void between the cone and the liner simultaneously and allowed to cure.

The application of the composite strips to the conical surface 104 of the member 102 results in the strips overlapping and forming rhombic voids 150. The bottom of each void is closed by the conical surface of the member 102 and the top closed by the surface 116 of the cup 114. The progressively increasing diameter of the surface 104 causes the volume of the voids 150 to increase progressively toward the end of the pipe 10. Accordingly, any relative movement between the pipe and the connector results in a reduction of the volume of the voids which is resisted by the injected thermosetting polymer. The spaced conical surfaces 104,116 prevent the composite strips from expanding radially as an axial load is applied. The polymer used may typically be a vinyl ester such as that available from Dow Chemical under the trade name DOW Derakane 411 Vinyl Ester. Other thermosetting polymers including epoxies or polyesters could be used or alternatively thermoplastic polymers such as polyamide or polyethylene with a suitable melt temperature can be used.

The composite strips 64 of layers 58 and 60 are braided to one another for their last six inches as shown in FIG. 4.

Figure 7:
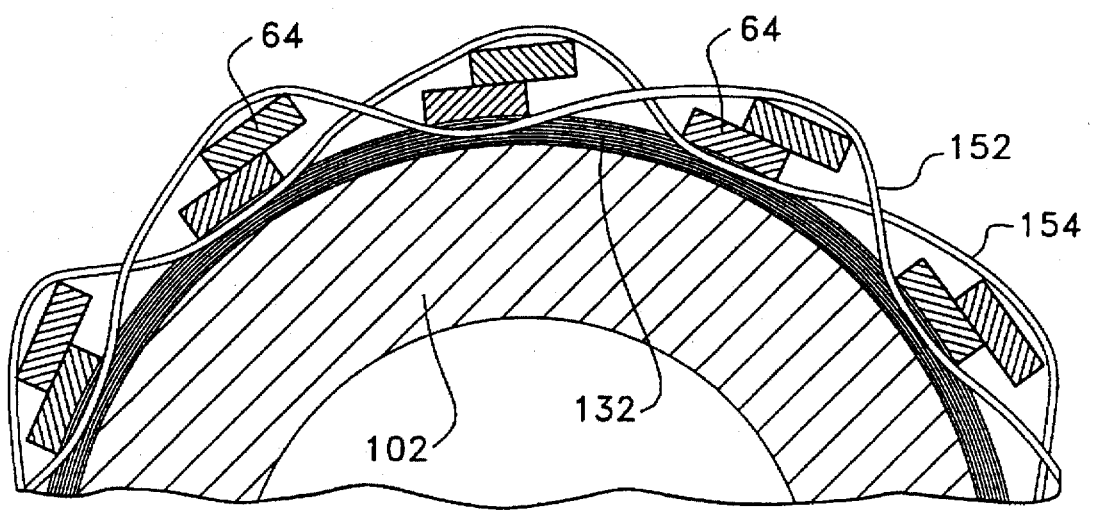
FIG. 7 is a view of the line 7—7 of FIG. 5.

The braiding applied to the composite strips is best seen in FIGS. 5 and 7, and includes a pair of circumferential bands 152,154 of braiding wire that is interwoven with the braided layers of composite strips. The bands 152,154 provide a mechanical abutment against the recess 136 and with the braiding of the strips 58,60 binds the ends to one another to prevent the strips from unravelling or extruding from between the surfaces.

The anchoring of the strips to one another and to the recess 136 also facilitates the fractional engagement of the composites against the conical surface as axial loads are applied to enhance further the retention of the pipe with the connector. With the anchoring of the strips, an axial load tends to cause the strips to engage the conical surfaces as a band brake so that the greater the load, the greater the frictional retention. It is contemplated that under certain conditions a cylindrical surface could be used for the insert with sufficient frictional engagement of the strips being provided from their mechanical interconnection and braiding.

In tests with a sample pipe, axial loads in the order of 60,000 lbs. have been accommodated.

We claim:

1. A pipe assembly including a length of pipe and a connector at one end thereof for connecting the pipe to a fitting, said pipe having an inner layer and a plurality of outer layers with at least two of the outer layers having respective helically wound composite strips of opposite hand, said connector including a conical member, a flange for connecting said conical member to said fitting a cup and a fastener to interconnect said cup and conical member, said conical member being inserted between said inner layer and said outer layers, said inner layer being restrained by said fitting and said flange with said composite strips extending across a conical outer surface of said conical member and crossing over one another to define voids of progressively increasing volume toward said one end, said cup having a conical inner surface engageable with a side of said outer layers opposite to said conical member, said fastener applying an axial load between said cup and said conical member to engage said outer layers independently of said inner layer, said voids having a filler therein to oppose a change in volume and inhibit relative axial movement between said pipe and said connector.

2. A pipe assembly according to claim 1 wherein ends of said composite strips are mechanically interconnected to one another.

3. A pipe assembly according to claim 2 wherein said ends are braided to one another.

4. A pipe assembly according to claim 3 wherein one of said conical surfaces is formed with a circumferential recess to receive said braiding.

5. A pipe assembly according to claim 2 wherein said strips are mechanically interconnected by braiding wire extending circumferentially about said conical member.

6. A pipe assembly according to claim 1 wherein said flange is threaded to said conical fitting.

7. A pipe assembly according to claim 1 wherein said fastener extends between said flange and said cup.

8. A pipe assembly according to claim 7 wherein said fastener includes a plurality of threaded studs extending axially between and flange and said cup.

9. A pipe assembly according to claim 8 wherein said studs project from said flange in a direction opposite to said cup to provide an attachment for an adjacent fitting.

10. A pipe assembly according to claim 1 wherein said inner layer includes a liner that extends through said flange and across a face thereof opposite to said fitting and radially from the axis of said pipe.

11. A pipe assembly according to claim 10 wherein a filler is located between said inner layer and said conical member.

12. A pipe assembly according to claim 11 wherein said filler is hardenable after insertion.

13. A pipe assembly according to claim 12 wherein said filler is thermosetting polymer.

14. A pipe assembly according to claim 13 wherein said filler in said voids is thermosetting polymer.

15. A pipe assembly according to claim 1 wherein said filler in said voids is curable after insertion.

16. A pipe assembly including a length of pipe and a connector at one end thereof for connecting the pipe to a fitting, said pipe having an inner layer and a plurality of outer layers with at least two of the outer layers having respective helically wound composite strips of opposite hand, said connector including a conical member, a flange for connecting said conical member to said fitting a cup and a fastener to interconnect said cup and conical member, said conical member being inserted between said inner layer and said outer layers, said inner layer being restrained by said fitting and said flange with said composite strips extending across a conical outer surface of said conical member and crossing over one another to define voids of progressively increasing volume toward said one end, said cup having a conical inner surface engageable with a side of said outer layers opposite to said conical member, said fastener applying an axial load between said cup and said conical member to engage said outer layers independently of said inner layer, said voids having a filler therein to oppose a change in volume and inhibit relative axial movement between said pipe and said connector, wherein ends of said composite strips are mechanically interconnected to one another, wherein said ends are braided to one another, and wherein one of said conical surfaces is formed with a circumferential recess to receive said braiding.

17. A pipe assembly including a length of pipe and a connector at one end thereof for connecting the pipe to a fitting, said pipe having an inner layer and a plurality of outer layers with at least two of the outer layers having respective helically wound composite strips of opposite hand, said connector including a conical member, a flange for connecting said conical member to said fitting a cup and a fastener to interconnect said cup and conical member, said conical member being inserted between said inner layer and said outer layers, with said composite strips extending across a conical outer surface of said conical member and crossing over one another to define voids of progressively increasing volume toward said one end, said cup having a conical inner surface engageable with a side of said outer layers opposite to said conical member, said fastener applying an axial load between said cup and said conical member to engage said outer layers independently of said inner layer, said voids having a filler therein to oppose a change in volume and inhibit relative axial movement between said pipe and said connector, wherein said conical member is connected to a flange for connection to said fitting, and wherein said inner layer includes a liner that extends through said flange and across a face thereof opposite to said fitting and radially from the axis of said pipe said inner layer being restrained by said fitting and said flange.

18. A pipe assembly according to claim 17 wherein a filler is located between said inner layer and said conical member.

19. A pipe assembly according to claim 18 wherein said filler is hardenable after insertion.

20. A pipe assembly according to claim 20 wherein said filler is a thermosetting polymer.

* * * * *